(12) United States Patent
Comerio

(10) Patent No.: US 8,840,741 B2
(45) Date of Patent: Sep. 23, 2014

(54) METHOD AND APPARATUS FOR REGISTERED EMBOSSING OF A LAMINATE

(75) Inventor: Carlo Comerio, Solbiate Olona (IT)

(73) Assignee: Rondolfo Comerio SRL, Solbiate Olona (VA) (IT)

( * ) Notice: Subject to any disclaimer, the term of this patent is extended or adjusted under 35 U.S.C. 154(b) by 255 days.

(21) Appl. No.: 13/281,249

(22) Filed: Oct. 25, 2011

(65) Prior Publication Data

US 2012/0097315 A1  Apr. 26, 2012

(30) Foreign Application Priority Data

Oct. 26, 2010 (EP) ..................................... 10188888

(51) Int. Cl.
*B32B 41/00* (2006.01)
(52) U.S. Cl.
USPC ............. 156/64; 156/209; 156/219; 156/350; 156/351; 156/361; 156/378; 156/379; 156/581; 156/582
(58) Field of Classification Search
USPC ........... 156/64, 209, 219, 350, 351, 361, 378, 156/379, 581, 582
See application file for complete search history.

(56) References Cited

U.S. PATENT DOCUMENTS

| | | | |
|---|---|---|---|
| 4,361,260 A | 11/1982 | Hanlan | |
| 4,612,074 A | 9/1986 | Smith et al. | |
| 6,183,671 B1 | 2/2001 | Stauffacher et al. | |
| 6,272,982 B1 | 8/2001 | Stauffacher et al. | |
| 6,416,607 B1 | 7/2002 | Tsai et al. | |
| 2007/0059492 A1* | 3/2007 | Oldorff | 428/151 |
| 2007/0070503 A1* | 3/2007 | Boswell et al. | 359/566 |

FOREIGN PATENT DOCUMENTS

| | | |
|---|---|---|
| DE | 102004054764 | 6/2005 |
| EP | 1153736 | 11/2001 |
| WO | WO 03/080337 | 10/2003 |

OTHER PUBLICATIONS

European Search Report from European Patent Application No. 10188888.1 dated Apr. 8, 2011.

* cited by examiner

*Primary Examiner* — Christopher Fiorilla
*Assistant Examiner* — Joshel Rivera
(74) *Attorney, Agent, or Firm* — Dorsey & Whitney LLP

(57) ABSTRACT

Process for providing a laminate product comprising a substrate and a printed film, the process comprising an embossing step synchronized with a decoration of the printed film and carried out continuously, through the passage of the laminate product between an engraved embossing cylinder, and a pressure counter-cylinder; the registration of the engraved cylinder, for keeping the synchronism between embossing and decoration, comprises suitable displacements of the engraved cylinder and is carried out with a temporary separation of the counter-cylinder from the engraved cylinder, or with a reduction in the embossing pressure existing between the engraved cylinder and the counter-cylinder.

18 Claims, 6 Drawing Sheets

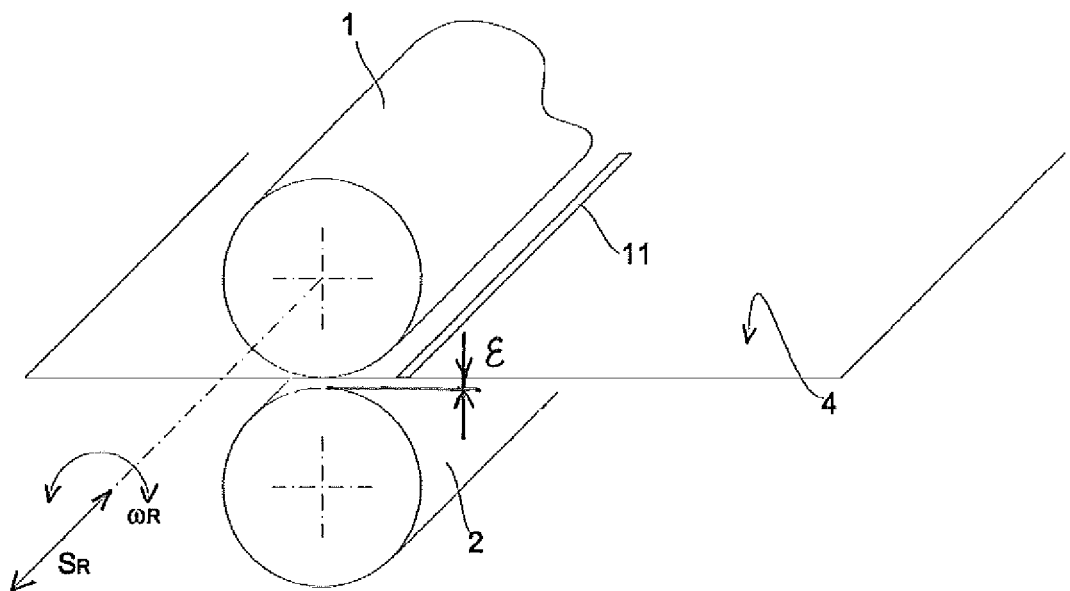
Fig. 4.1
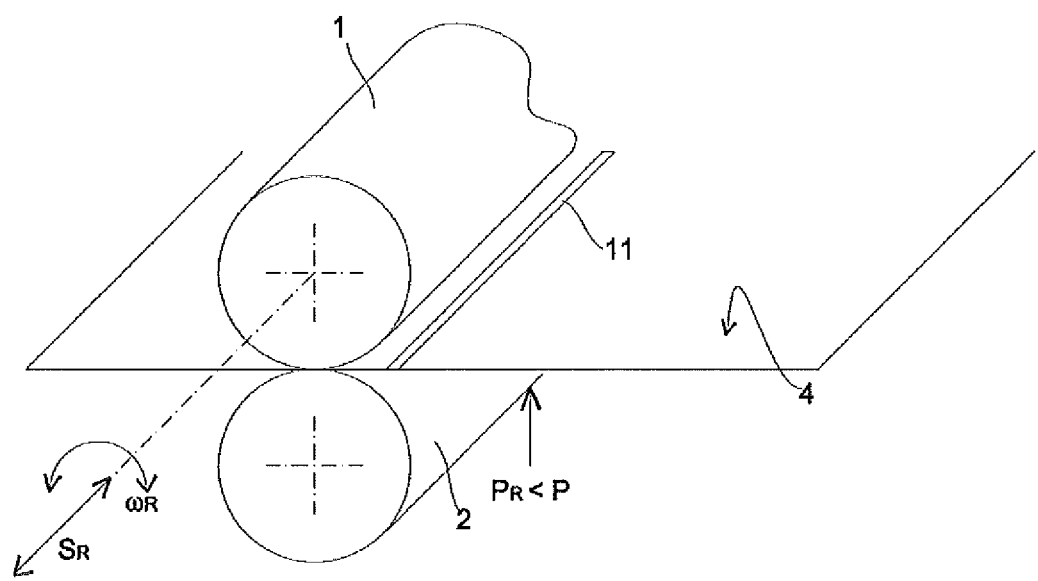
Fig. 4.2

METHOD AND APPARATUS FOR REGISTERED EMBOSSING OF A LAMINATE

CROSS-REFERENCE TO RELATED APPLICATIONS

This application claims priority to European Patent Application No. 10188888.1 filed on 26 Oct. 2010, the contents of which are incorporated herein, in their entirety, by this reference.

TECHNICAL FIELD

Embodiments of the invention relate to the field of production of laminated products, in particular laminated products reproducing a natural material, such as for example wood. Embodiments of the invention, in particular, relate to an embossing technique of the aforesaid laminated products which is registered (synchronised) with a pre-printed drawing.

BACKGROUND

Laminated materials and coatings are known from the prior art, comprising a substrate serving as a support coated by a film printed with a decoration. Typically, the decoration reproduces a noble and/or natural material. For example, a known laminate is formed by a substrate comprising a given number of superimposed glass fibre reinforced PVC films, and a printed film, also reinforced and therefore not extensible, or non reinforced and therefore extensible, reproducing the appearance of a noble material, such as wood.

This technique is commonly used for producing imitation wood floorings which are named "wood effect" or "parquet effect" or simply "laminated parquet".

The development of the printing techniques, including digital printing, allows a very high quality printing capable of a very good imitation of any natural material. For example, it is possible to obtain accurate reproduction of the colours, the tones and the grains of any type of wood. However, the above is not enough to confer to the product an acceptable aspect, given that the surface of the coating film is glossy and smooth to touch, thus being absolutely unnatural and quite far from the appearance of a natural material such as wood.

In order to overcome this drawback, it is known to subject the laminate to an embossing process, after the coupling between the substrate and the printed film. The embossing process imparts a series of reliefs on the surface of the laminate, creating a roughness that is perceptible to touch, bringing the product closer to the desired natural aspect.

A first technique provides for imparting a continuous embossing, substantially by passing the laminate continuously between an engraved cylinder and an opposite pressure cylinder also referred to as "counter cylinder". This technique is quick and can substantially be implemented directly "in line" with the printing and coupling between the substrate and printed film, operating at the same speed. However, this solution is not satisfactory because the embossing pattern generated by the engraved cylinder is repeated periodically at each complete rotation of the cylinder, thus being not coordinated with the printing. For example, the pattern of the roughness is not consistent with the grains, nodes, or other distinctive features of the wood reproduced by the printing. Substantially, the aspect of the finished product, although slightly improved to touch with a surface that seems rough instead of smooth, is clearly perceived as artificial.

In order to overcome also this drawback, processes of registered or synchronized embossing are also known, wherein the roughness produced by the embossing on the surface of the laminate are specifically coordinated with the printed decoration. It can be understood that the embossing member is specific for a given decoration in this case.

The process of registered embossing produces a realistic imitation of a natural material (wood, stone, etc. . . . ), but reveals some technical problems. Actually, it is necessary to ensure that the embossing is strictly carried out in a registered manner, so that the three-dimensional profile engraved onto the surface of the laminate accurately matches with the printing on the film. Actually, a possible misalignment or delay/advance of the engraved cylinder would jeopardize the process creating a product with unnatural and unsatisfactory appearance. In the prior art, in order to attain this object, the registered embossing is carried out in a discontinuous manner, i.e. substantially through the following steps:

a) a laminated sheet, produced continuously, is cut into panels having a predetermined dimension, for example 2×4 meters;

b) each panel is conveyed singularly to an embossing machine which substantially operates as a press; the panel is aligned on the two axes, with respect to the embossing member, with the help of suitable references;

c) finally, the embossing press engraves the desired relief (embossing) on the surface of the panel.

An accurate aligning, as indicated in step b), allows obtaining an accurate registered embossing. The references can be generated during the printing, for example in portions of the panel intended to be discarded during a subsequent step of cutting into strips.

A drawback of this technique lies however in the discontinuous operation, which is slow and expensive. Furthermore, the off-line embossing press is expensive and bulky. Since the referred laminate is typically a low cost product, there is a need of simplifying and making the process as inexpensive as possible. For such purpose, a felt need is to operate the embossing continuously, i.e. directly on the sheet (or strip) of laminate instead of on previously cut panels, but in the prior art, up to now, this has not been deemed viable.

One of the reasons is the high pressure that is required for the embossing, and which does not allow to use the registering techniques which are known from the field of printing.

More in detail, and with the aim of disclosing the technical problem, it is considered that the thrust between printing cylinders is generally less than 10 kg for each centimeter of length of the generatrix of the cylinder (kg/cm). Typically, the thrust is 5-10 kg/cm. This value makes possible a forward or rearward sliding of the cylinders, allowing keeping registered the various colours which are applied one after the other in the polychrome printing. However, in the case of the embossing, the thrust is considerably higher, typically greater than 20 kg/cm and preferably between 50 and 75 kg/cm. So far, a sliding of the engraved cylinder with the aim of maintaining the registered condition has been deemed incompatible with such thrust.

SUMMARY

An object of one or more embodiments of the invention is to overcome the above mentioned drawbacks. More precisely, an object of one or more embodiments of the invention is that to provide an efficient, quick and cost-effective technique for registered (or synchronised) embossing of a laminate product of the referred type.

Such object is achieved with a process for providing a laminate product comprising the steps of:
- continuous coupling between a support substrate and a printed film with a predetermined decoration, obtaining a laminate sheet;
- synchronized embossing of the laminate sheet, the embossing being synchronized with the decoration of the printed film;

and characterised in that:
- the embossing is carried out continuously, by means of passage of the laminate product between at least one engraved embossing cylinder, and a pressure counter-cylinder, a nominal embossing pressure existing between the engraved cylinder and the counter-cylinder;
- the process comprises operations for registering the position of the engraved cylinder, to keep the synchronisation between the embossing and the decoration of the printed film, a registration operation comprising suitable registration displacements of the engraved cylinder;
- the registration displacements are carried out in conjunction with a temporary separation between the engraved cylinder and the counter-cylinder, setting to the embossing pressure to null, or in conjunction with a reduction of the embossing pressure, at a reduced registration pressure lower than the nominal pressure.

The process may be advantageously applied to laminates with printed film of the so-called inextensible type. An inextensible film is understood as a film that substantially does not or cannot undergo elongation caused by external factors such as fraction stress and/or temperature. Typically, an inextensible film comprises a rigid armature fabric. The armature fabric is, for example, glass fibre.

Preferably, an embossing process according to an embodiment of the invention comprises the following steps: prior to printing, a film suitable for printing is coupled with, or spread onto, an armature fabric, thus obtaining a reinforced armed film; the armed film is subject to a process for printing the decoration; after the printing process, the film is coupled to the substrate forming a laminate product; the inextensible laminate thus obtained, comprising reinforced substrate and film, is subject to the embossing step. The film and the reinforcing fabric may be coupled with different per se known techniques, this not being essential for practicing embodiments of the invention.

The term "registration displacements" is used to indicate the displacements of the engraved cylinder required so that the embossing is correctly synchronized with the decoration printed on the film. The decoration repeats with a given frequency, which is correlated to the diameter of the engraved cylinder; consequently, the registration is preferably carried out at least for each revolution of the engraved cylinder.

The registration may comprise a rapid forward or rearward rotation of the engraved cylinder, to correct a delay error or an advance error relative to the longitudinal direction of advancement of the laminate, and/or an axial displacement of the engraved cylinder, to correct a positioning error in the transverse direction, i.e. perpendicular to the abovementioned direction of advancement.

In some embodiments of the invention, the laminate is destined to be cut into identical panels of the same length, and consequently the laminate comprises portions of a desired length, equal to the development of the printed decoration and subsequently imprinted by the engraved cylinder. The portions define a pitch of the laminate. Between two of the portions, the laminate comprises a narrow portion or band intended to be discarded, also called joining portion. With this type of laminate, the described registration is preferably carried out during the passage of the joining portions between the cylinders.

The registration may be advantageously guided by suitable references or "notches" made on the printed sheet of the laminate, which are detected by suitable readers, such as for example optical readers, according to a technique which is per se known, being used for printing. The distance between the references (equal to the diameter of the engraved cylinder) is known and constant in a laminate comprising a substrate coupled to an inextensible film, since the elongation of the laminate is null or negligible.

An embodiment of the invention comprises finding of a temporarily reduction or annulment of the thrust pressure between the cylinders, so as to allow the engraved cylinder to perform the required registration displacements, forward/rearwards or laterally. The thrust pressure is referred to the contact line of the laminate with the cylinders and is normally expressed in kg/cm, as shall be explained more in detail hereinafter. In some embodiments, the thrust pressure is annulled by the effect of a detachment ("opening") between the counter-cylinder and the engraved cylinder.

A first general embodiment of the invention provides for a temporary detachment between the engraved cylinder and the pressure counter-cylinder. Consequently, the thrust pressure is null during the registration operation. Preferably, the detachment is caused by a separation of the counter-cylinder from the engraved cylinder (the axis of the engraved cylinder being fixed). Advantageously, the counter-cylinder is distanced from the engraved cylinder by a distance of a few millimeters, more preferably the separation distance is less than or equal to 2 mm.

The registration operations therefore generate short laminate portions without the embossing imprint. This embodiment may be applied when such consequence is acceptable and this happens, for example, when the laminate is intended to be die-cut into sheets of a predetermined length (for example sheets similar to staves of a parquet, with wood-like print) and the laminate comprises the aforesaid joining portions intended to be discarded. Registration can be carried out during the quick passage of the joints between the cylinders, so that non-embossed zones remain localised on the laminate portions that will be discarded.

A second general embodiment of the invention provides for a temporary reduction of the thrust pressure, while keeping contact between the engraved cylinder and the pressure counter-cylinder. Advantageously, the reduced pressure is 50% or less than the normal embossing pressure, and even more advantageously the pressure is not greater than 20 kg/cm. For example, an embossing pressure of about 50 kg/cm may be reduced to a registration value equal to about 5-10 kg/cm. It has been found that by reducing the thrust pressure to a value lower than the nominal embossing pressure, and for example comparable with that of printing, it is possible to perform the registration of the engraved cylinder without the risk of damaging the laminate, also thanks to the fact that the film is in a plastic state by the effect of the temperature. The temperature is advantageously higher than 150° C. and more preferably between 150 and 200° C.

The second embodiment is preferred when non-embossed zones on the end product are not acceptable. The need of avoiding non-embossed zones exists, for example, when lengths of the end-product laminate are not defined in advance. Keeping the contact between engraved cylinder and counter-cylinder also during the registration, although with a reduced pressure, the method of this embodiment ensures that no embossing-free zones are left on the laminate. A laminate portion passing between the cylinders during the registration may have a less deep embossing but, generally, the result is acceptable on the end product.

The following is a preferred implementation, applicable to both the embodiments mentioned above. An embossing machine essentially comprises an engraved cylinder and a counter-cylinder associated to a hydraulic system which delivers the required thrust pressure. The hydraulic system comprises at least one hydraulic cylinder and a piston that generates the thrust pressure on the counter-cylinder.

The piston acts directly on the counter-cylinder in some embodiments of the invention, or according to other embodiments, the piston acts indirectly through an interface member. The optional interface member for example is an eccentric arranged between piston and counter-cylinder and the eccentric is controlled by an electrical motor.

During the normal operation, the hydraulic cylinder is controlled so as to keep the thrust pressure of the counter-cylinder constant with means that advantageously comprise: a hydraulic circuit with a pump, at least one suitable valve, or multiple valves if required, suitable transducers, a control PLC.

Preferably, the hydraulic cylinder is dual effect cylinder, comprising two chambers fillable with a fluid (normally oil) under pressure, so that the fluid acts on opposite surfaces of the piston. In this preferred embodiment, the thrust pressure P may be formulated as:

$$P = k(P_A - P_B)$$

wherein:

P [kg/cm] is the thrust pressure between the cylinders, also called embossing pressure, conventionally measured in kg per linear centimeter.

$P_A$ [Pa] is the fluid pressure within a first chamber of the dual effect cylinder, acting on one end of the piston, $P_B$ [Pa] is the fluid pressure within a second chamber of the cylinder, acting on the opposite end of the piston and which thus hinders the pressure $P_A$, k is a proportionality constant that substantially depends on the geometry (piston area, cylinder length, etc.).

Two preferred modes of carrying out the registration are as follows.

A first registration mode is termed "opening of the counter-cylinder" and comprises the following steps: i) temporarily changing the control mode of the hydraulic cylinder, more in particular the control mode changes from the so-called "thrust" or "constant pressure" mode, to a "position control" mode; ii) separating the counter-cylinder from the engraved cylinder, leaving a free space between the two cylinders and carrying out the required registration movements; iii) returning the counter-cylinder in contact with the engraved cylinder, and returning the control mode of the hydraulic cylinder to constant pressure.

The opening parameters of the counter-cylinder are advantageously adjustable by the operator, in particular the distance between the two cylinders (that is, between engraved cylinder and counter-cylinder) and the opening time. Typically, the distance is of a few millimeters (for example 2 mm or less) and the time is of a few milliseconds (for example 10-50 milliseconds), but the parameters may vary according to speed, pitch, product features etc. and shall thus be determined according to the specific needs.

During the opening of the counter-cylinder, the engraved cylinder may perform the required registration movements, i.e. the rapid forward or rearward rotation and/or axial displacement registration movements. Once the registration has been completed, the hydraulic piston returns to the original position and the thrust (or constant pressure) operating mode is restored.

In the "thrust" or "constant pressure" working mode, which is adopted during the embossing, the hydraulic piston is controlled so as to keep the force transmitted to the counter-cylinder, and thus the pressure between the counter-cylinder and the engraved cylinder, to a constant value, thus compensating for little displacements or deformations. For example, in the preferred embodiment with a dual effect piston as described above, the hydraulic circuit is controlled for keeping the difference $(P_A - P_B)$ constant.

In the "position control" working mode, the hydraulic system is controlled (via PLC) based on the piston position, which is detected by an appropriate sensor like a linear transducer. The hydraulic system may keep the piston position or move the position thereof by a few millimeters (for example 2 mm or less) as required by the PLC.

A second registration mode is termed "low pressure of the counter-cylinder" and provides for reducing the thrust pressure from the nominal embossing value to a lower registration value. For example, using a dual effect piston of the type mentioned above, pressure $P_A$ remains constant whereas pressure $P_B$ increases, so that the actual thrust proportional to $(P_A - P_B)$ is made lower. In suitable conditions of temperature and thrust pressure, the registration is made possible by the state of plasticity of the laminate.

A further aspect of the invention is the correction of a synchronisation error between the embossing and the printing, by modifying the temperature of the engraved cylinder. For example, a cylinder with a 480 mm diameter undergoes an increase in the circumference of about 0.2 mm every 10° C. increase of its temperature. The circumference of the engraved cylinder, in fact, must usually be the same as the pitch of the printing on the laminate, otherwise a systematic error would occur, i.e. at each rotation the engraved cylinder would accumulate advance or delay relative to the laminate.

A machine for the production of a laminate, adapted to operate with the previously described method is also an object of one or more embodiments of the present invention.

For example, an apparatus for making a laminate product with registered embossing according to an embodiment of the invention comprises: at least one embossing engraved cylinder and a pressure counter-cylinder for the continuous embossing of a laminate product; a hydraulic system arranged for imparting a thrust of the counter-cylinder towards the engraved cylinder, for obtaining an embossing thrust pressure; means for the periodical registration of the engraved cylinder relative to the laminate, and is characterised by means for controlling the hydraulic system, suitable for temporarily separating the counter-cylinder from the engraved cylinder, or suitable for temporarily reducing the thrust pressure, during the registration of the engraved cylinder.

Preferably, the hydraulic system comprises: at least one hydraulic cylinder and a piston acting on the counter-cylinder either directly or through an interface member. Preferably, the hydraulic cylinder is dual effect and comprises a first pressurised chamber and a second pressurised chamber, so that the thrust pressure generated by the hydraulic system results from the difference between the pressures respectively in the first and in the second chamber.

Embodiments of the invention make efficient and economically feasible the continuous registered (synchronised) embossing of a laminate, for example of a floor wood-effect laminate. It is clear that such exemplary application is mentioned as a non-limiting indication only. Thus, an embodiment of the invention allows obtaining laminates of high aesthetic quality, for example laminates reproducing a parquet floor, improving the productivity and at a lower cost compared to the prior art.

The advantages of the embodiments of the invention shall be more evident with the help of the description that follows, referring to a preferred embodiment.

BRIEF DESCRIPTION OF THE FIGURES

FIG. 4.1 refers to the registration operation with opening of the counter-cylinder, according to a first embodiment of the invention.

FIG. 4.2 refers to the registration operation at "low pressure" of the counter-cylinder, according to another embodiment of the invention.

DETAILED DESCRIPTION

Figure 1:
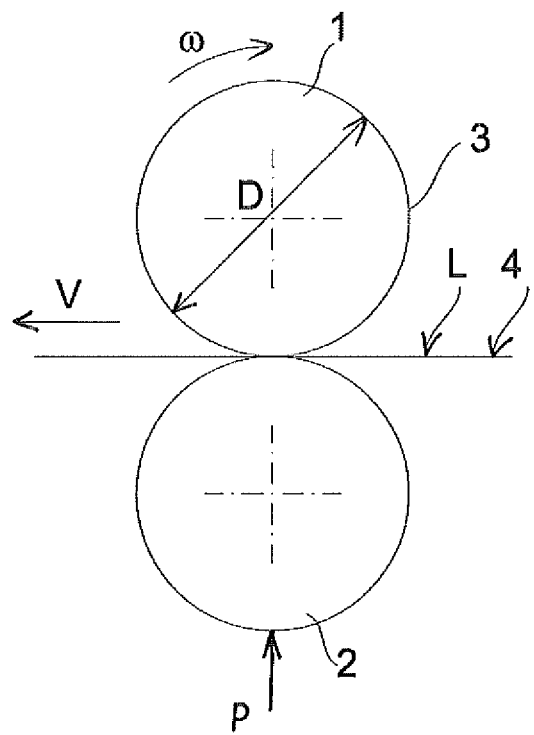
FIG. 1 is a scheme of a process of continuous registered embossing according to an embodiment of the invention, illustrating a laminate sheet, the engraved cylinder and the counter-cylinder.

FIG. 1 illustrates an embossing process according to one of the embodiments of the invention. A laminate sheet, globally denoted with L, is conveyed with a speed V between an engraved embossing cylinder 1 with diameter D, and a counter-cylinder 2. The counter-cylinder 2 imparts a thrust pressure P on the engraved cylinder 1, to guarantee the efficiency of the embossing. The thrust pressure is also called embossing pressure. Surface 3 of the engraved cylinder 1 comprises suitable reliefs which, by contact, generate a relief pattern on face 4 of laminate L. The engraved cylinder 1 rotates at a velocity ω (omega). The counter-cylinder 2 is usually coated with rubber.

The structure of the laminate sheet L is per se known and it comprises a substrate, for example obtained by superimposition of glass fibre reinforced films, adapted to confer the required rigidity and consistency to the product; a printed film forming the face 4 is applied, for example glued or hot-coupled, to the substrate. The printed film is also reinforced with glass fibre, so that the laminate product is substantially inextensible.

Figure 2:
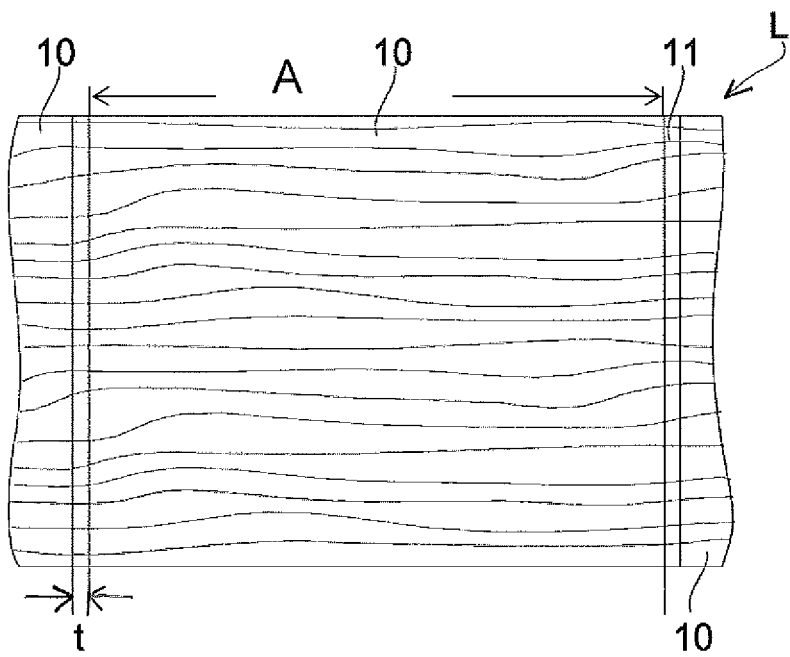
FIG. 2 is a top view of the laminate sheet of FIG. 1.

For example, laminate L is a laminate for parquet effect floors, wherein face 4 of laminate L has a printed decoration reproducing the appearance of wood (FIG. 2).

With reference to FIG. 2, in the direction of the length of laminate L there are portions 10 of a predetermined length A. The printed decoration is repeated at each length A of laminate. The example refers to a laminate L intended to be cut into panels of length A, which panels shall then be intended to be cut into floor strips of commercial dimensions. Consequently, portions 10 are separated by brief joint sections 11, with length "t", to allow the cutting of the laminate into panels corresponding to portions 10.

The embossing is performed in a registered manner, directly on the laminate sheet L and keeping the engraved cylinder 1 synchronized with the advancement of the laminate sheet L, thus ensuring that the embossing precisely coincides with the decoration, obtaining a particularly natural aspect of the product.

Figure 3:
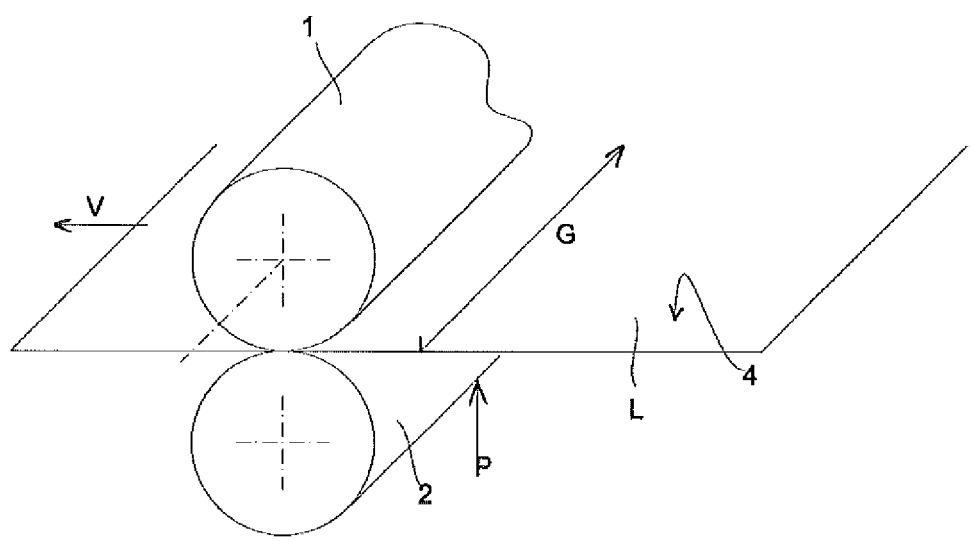
FIG. 3 is a scheme of the process, with the components and in particular the engraved cylinder and the counter-cylinder in axonometric view, during the normal embossing process.

The embossing pressure P is normally referred to the length of the ideal contact line G (FIG. 3) between cylinders 1, 2 and sheet L. The pressure is commonly expressed in kg/cm. The embossing of a laminate of the type considered herein requires, for example, an embossing (nominal) pressure P normally between 50 and 75 kg/cm, such range however being not limiting for the application of embodiments of the invention. FIG. 3 refers to the embossing step wherein the nominal embossing pressure P acts on counter-cylinder 2 and therefore on laminate L.

FIGS. 4.1 and 4.2 exemplify two modes of carrying out the embodiments of the invention, respectively registration with opening of counter-cylinder 2, and so-called "low pressure" registration.

In FIG. 4.1, the registration of the engraved cylinder 1 is carried out in conjunction with a separation of counter-cylinder 2 from the engraved cylinder 1. Counter-cylinder 2 is controlled so as to separate from the engraved cylinder 1 by a distance "s" which preferably is about 2 mm or less.

In FIG. 4.2, the registration of the engraved cylinder 1 is performed in conjunction with a reduction of the embossing pressure. More in detail, counter-cylinder 2 is controlled so as to deliver a thrust pressure $P_R$ lower than the nominal working pressure P. Such reduced pressure $P_R$ is suitable for allowing a sliding between engraved cylinder 1 and surface 4 of laminate L, which is in contact with the engraved cylinder 1. The reduced pressure $P_R$ may be determined according to contingent needs, among which laminate features, surface temperature, velocity, etc.

For example, the value of the reduced pressure $P_R$ is preferably equal to 50% of the nominal pressure P, or lower than 50%. In absolute terms, the reduced pressure $P_R$ is preferably lower than 20 kg/cm and more preferably it is comprised in the range 5-10 kg/cm. At the end of the registration operation, the thrust pressure is restored to the nominal value P. It should be noted that the previous case of FIG. 4.1 with separation of counter-cylinder 2 may be considered with a reduced pressure $P_R$ equal to null.

While the thrust pressure is reduced as in FIG. 4.2, or while counter-cylinder 2 is open as in FIG. 4.1, the engraved cylinder 1 is controlled to perform the required registration through quick rotation movements $\omega_R$ and/or axial displacements $s_R$ as indicated in the figures. A rotation movement $\omega_R$ may correct an advance or delay error of the engraved cylinder 1 relative to laminate L, whereas an axial displacement $s_R$ may correct a misalignment perpendicular to the direction of advancement of sheet L.

Figure 5:
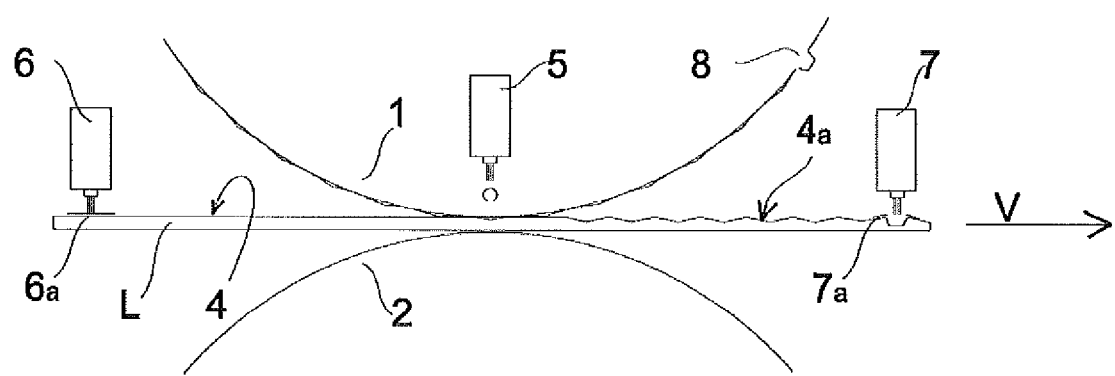
FIG. 5 is a detail of the contact zone between the embossing cylinder and the laminate, according to a preferred embodiment.

The magnitude of the registration movements $\omega_R$ and/or $s_R$ is preferably calculated in accordance with a signal provided by suitable notch readers, for example at least one notch reader arranged for detecting the position of the engraved cylinder 1, and a notch reader arranged to detect the position of the sheet L of the laminate. Such process is further schematised in FIG. 5, showing a notch reader 5 which detects the position of the engraved cylinder 1, by reading a reference on a side of the same, a reader 6 which detects a notch 6a printed on surface 4 of sheet L, and a reader 7 that detects the position of imprint 8 left by the engraved cylinder 1 relative to the position of the printed notch 7a. FIG. 5 also shows the generation of an embossed surface 4a upon the passage between cylinders 1 and 2. The distance between the references or notches detected by reader 6 is known and constant, by the effect of the non-extensibility of the laminate.

Preferably, as shown in FIGS. 4.1 and 4.2, the registration operation is performed at the passage of a joining portion 11 (when existing on the laminate) in the embossing zone between cylinders 1 and 2. This allows preventing any risk that the same registration operation interferes with the quality of the product.

Figure 6:
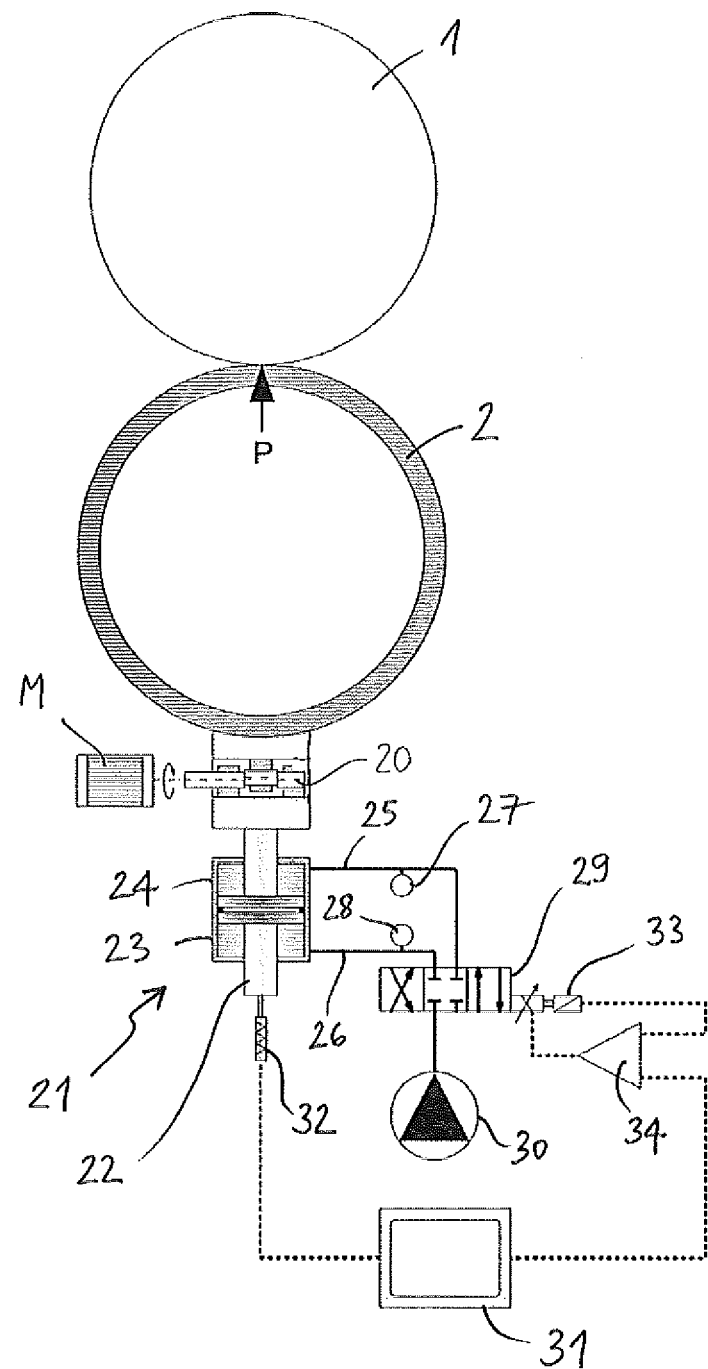
FIGS. 6-8 are schemes of some preferred modes for carrying out a hydraulic control of the counter-cylinder of FIG. 1.
Figure 7:
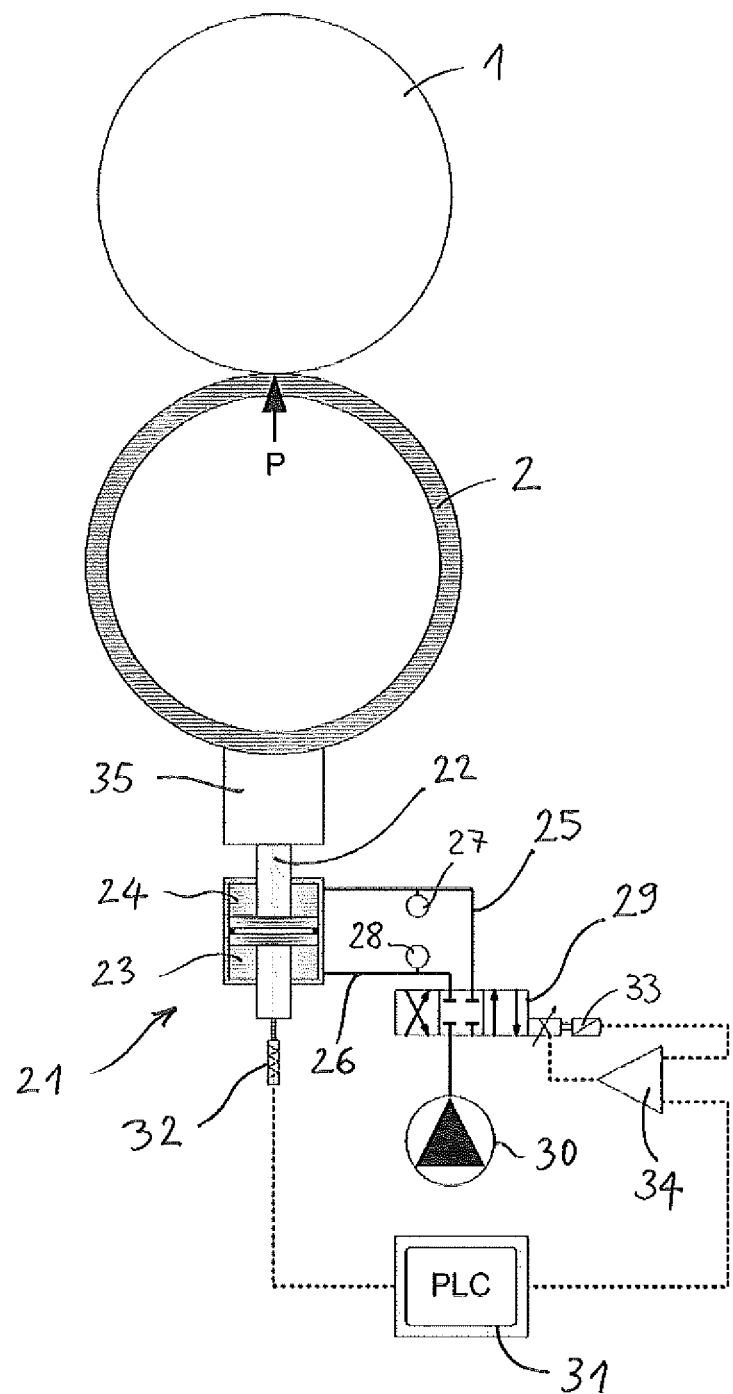
Figure 8:
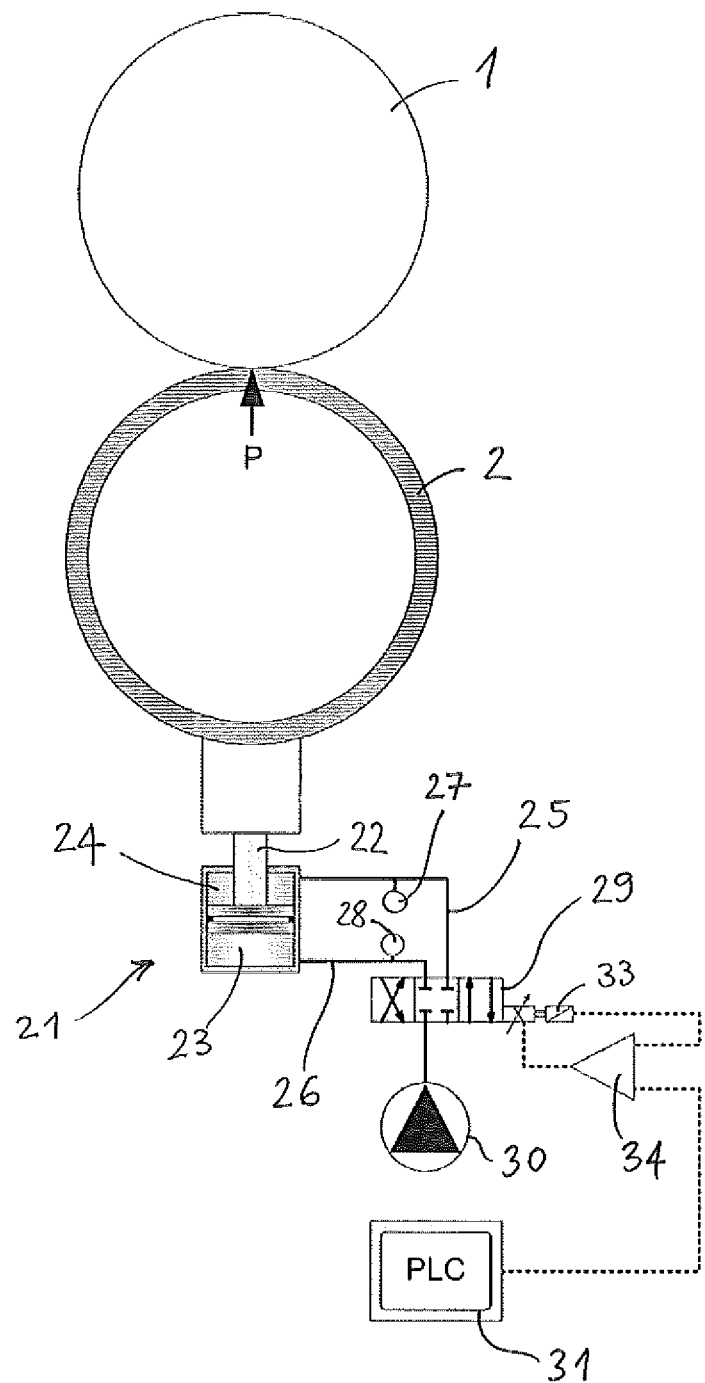

FIGS. 6-8 show preferred embodiments of a hydraulic control acting on counter-cylinder 2 and adapted for allowing the opening or the pressure reduction for the registration.

Example 1

In FIG. 6, counter-cylinder 2 is pushed against the engraved cylinder 1 by a hydraulic cylinder 21, with the interposition of an eccentric 20 actuated by an electric motor M. The eccentric 20 is optional. The hydraulic cylinder 21 is of a dual effect type and comprises chambers 23 and 24 fed with oil under pressure by a pump 30. The oil in chambers 23 and 24 acts on opposite faces of a piston 22 sliding in cylinder 21. The head of piston 22 is connected to counter-cylinder 2 through the eccentric 20.

Pump 30 feeds chambers 23, 24 by means of lines 25 and 26 and by means of a valve globally indicated by reference numeral 29; lines 25 and 26 comprise respective pressure transducers 27, 28.

A pressure $P_A$ in the first chamber 23 tends to push piston 22 upwards in the figure, that is, to push counter-cylinder 2 towards the engraved cylinder 1; a pressure $P_B<P_A$ in the second chamber 24, on the contrary, tends to push the piston 22 downwards, balancing in part the pressure in the first chamber 23. The resulting embossing pressure P between cylinders 1, 2 hence is proportional to the difference $(P_A-P_B)$.

The piston 22 is connected to a linear transducer 32 that provides a position signal to a PLC 31. A transducer 33, moreover, detects the pressure in valve 29. The valve 29 may switch between positions of locked cylinder, open cylinder and close cylinder. The PLC 31 globally controls the hydraulic circuit, and in particular it controls valve 29 through an amplifier 34. The dashed lines in the figure represent signal connections, whereas the continuous lines 25 and 26, and the delivery line of pump 30, represent connections of the hydraulic circuit.

During the registered embossing, the hydraulic cylinder 21 is controlled at a constant pressure, that is, it keeps a constant thrust transmitted to counter-cylinder 2 and thus, to the engraved cylinder 1.

The scheme of FIG. 6 is particularly suitable for the registration with opening of the counter-cylinder, as shown in FIG. 4.1. The registration is carried out as follows. The hydraulic cylinder 21 is switched from "constant pressure" to "constant position" working mode, through quick switches of valve 29, which act on the pressure in chambers 23 and respectively 24, keeping the piston 22 still.

In this step, the thrust on piston 22 is balanced by imposing $P_A=P_B$. A rotation of eccentric 20 moves counter-cylinder 2 downwards, in the figure, and causes the "opening" of the counter-cylinder 2 relative to the engraved cylinder 1, thus distancing the cylinders by the amount ϵ of FIG. 4.1. In these conditions, the engraved cylinder 1 perform the registration movements of advance/delay $\omega_R$ and/or axial alignment $s_R$ that may be controlled manually or, more preferably, may be calculated automatically thanks to the notch reading as shown, for example, in FIG. 5.

Upon completion of the operation, eccentric 20 returns to the normal operating position closing counter-cylinder 2. The hydraulic system returns to the operating condition, that is, PLC 31 controls the system for dispensing a constant thrust P again.

Example 2

In FIG. 7, the hydraulic system has no optional eccentric 20. In this embodiment, the piston 22 has a head 35 that acts directly by pushing counter-cylinder 2. The other elements are similar to those of FIG. 6 and denoted by the same reference numerals.

Also the scheme of FIG. 7 is suitable for the registration with opening of the counter-cylinder of FIG. 4.1. In this case, the hydraulic cylinder 21 is switched from "constant pressure" to "constant position" mode, and the thrust on piston 22 is balanced imposing $P_A=P_B$; thereafter, at the right time, counter-cylinder 2 separates from the engraved cylinder 1 by a space that for example is of a few millimeters (adjustable by the operator). Transducer 32 allows controlling the position of piston 22 and thus the amount of the opening space ϵ as indicated in FIG. 4.1. The next sequence is the same as that of Example 1.

Advantageously, the position of piston 22 (controlled by PLC through transducer 32), during the registration, is:
fixed, when the opening is caused by an interface member, such as for example eccentric 20 of FIG. 6, or
movable (variable), when the piston 22 acts directly on counter-cylinder 2, such as for example is shown in FIG. 7.

Example 3

In FIG. 8, the hydraulic system is further simplified comprising no linear transducer of the position of piston 22. Such embodiment is preferred when the registration is performed with the "low pressure" method of FIG. 4.2. During the registration, the control system keeps a constant pressure $P_A$ in chamber 23 and increases the opposite pressure $P_B$ in chamber 24 to a value $P_B^*>P_B$ (controlled through transducer 27 on line 25) with the effect that resulting thrust pressure is reduced to a value $P_R=P_A-P_B^*$. Or vice versa, the system may reduce pressure $P_A$ and in that case, it shall be controlled through transducer 28 on line 26.

It should be noted that such low pressure registration mode, without separation of counter-cylinder 2, can be carried out also with the hydraulic systems of FIG. 6 or FIG. 7.

In further (not shown) embodiments, the hydraulic system comprises a single-effect hydraulic cylinder. A command with a single-effect hydraulic cylinder is preferably used for implementation of the low-pressure registration mode of FIG. 4.2.

An optional aspect of the invention also provides for controlling the temperature of the engraved cylinder 1. In fact, such control can be useful for correcting a synchronisation error between embossing and printing, so as to meet the equivalence A=π·D. In other words, a temperature control serves to prevent or correct a systematic error that would be otherwise induced by a difference of D (by the effect of the thermal expansion of cylinder 1) compared to A.

The invention claimed is:
1. A process for making a laminate product, comprising:
substantially continuous coupling between a support substrate and a printed film with a predetermined decoration to thereby obtain a laminate sheet;
synchronized embossing of the laminate sheet, the embossing being synchronized with the decoration of the printed film;

wherein the embossing being carried out substantially continuously, by passage of the laminate product between at least one engraved embossing cylinder and a pressure counter-cylinder, a nominal embossing pressure existing between the engraved cylinder and the counter-cylinder;

registering the position of the engraved cylinder, to keep the synchronisation between the embossing and the decoration of the printed film, a registration operation comprising suitable registration displacements of the engraved cylinder;

wherein the registration displacements being carried out in conjunction with a temporary separation between the engraved cylinder and the counter-cylinder, setting the embossing pressure to null, or in conjunction with a reduction of embossing pressure to a reduced registration pressure lower than the nominal embossing pressure.

2. The process according to claim 1 wherein the printed film is substantially inextensible.

3. The process according to claim 2 wherein the inextensible printed film comprises a stiff reinforcing fabric, the fabric being preferably made of glass fibre.

4. The process according to claim 1, further comprising a registration operation including a forward or rearward rotation of the engraved cylinder, for correcting a delay or advance error with respect to the longitudinal direction of advancement of the laminate, and/or it includes an axial displacement of the cylinder, for correcting an alignment error between engraved cylinder and sheet, in the direction perpendicular to the direction of advancement.

5. The process according to claim 4 wherein the magnitude of the registration displacements is calculated automatically according to the detection of suitable references associated to the laminate sheet and to the engraved cylinder.

6. The process according to claim 1 wherein the laminate sheet comprises a plurality of portions which comprise the same decoration and are in a linear succession, defining a pitch of the laminate sheet, and laminate sheet comprising joining zones between the portions of the sheet, and the registration operations being performed during the passage of the joining zones between the engraved cylinder and the counter-cylinder.

7. The process according to claim 1 wherein the embossing pressure is generated by a hydraulic system comprising at least one hydraulic cylinder, a piston, and a transducer adapted for detecting the position of the piston, the piston acting on the counter-cylinder either directly or through an interface member, and wherein: during the embossing, the hydraulic system is controlled in constant pressure mode for maintaining the embossing pressure, and the act of registering the position comprises:
   i) temporarily changing the control mode of the hydraulic system from the constant pressure mode to a position control mode wherein the hydraulic system imposes a predetermined fixed or variable position to the piston;
   ii) separating the counter-cylinder from the engraved cylinder, leaving a free space between the two cylinders and performing the required registration movements;
   iii) returning the counter-cylinder in contact with the engraved cylinder and returning the control mode of the hydraulic cylinder to constant pressure, so as to restore the embossing pressure.

8. The process according to claim 7 wherein the position of the piston during the registration is fixed when the piston acts on the counter-cylinder through interface member, or the position is variable when the piston acts directly on the counter-cylinder.

9. The process according to claim 1 wherein the reduced thrust pressure is about 50% or less with respect to the nominal embossing pressure, and the reduced pressure being equal to or lower than 20 kg/cm.

10. The process according to claim 9 wherein the reduced pressure is in a range of about 5 to about 10 kg/cm.

11. The process according to claim 9 wherein the embossing pressure is generated by a hydraulic system comprising at least one hydraulic cylinder and a piston, the piston acting on the counter-cylinder either directly or through an interface member, the hydraulic cylinder being dual effect and comprising a first chamber under pressure and a second chamber under pressure; wherein the embossing pressure generated by the hydraulic system results from the difference between the pressure in the first chamber, and the pressure in the second chamber, the hydraulic system being controlled for increasing the pressure of the second chamber during the registration, obtaining the reduced pressure.

12. The process according to claim 1, further comprising a modification of the temperature of the engraved cylinder for correcting a systematic synchronisation error due to the thermal expansion of the engraved cylinder.

13. An apparatus for providing a laminate product with registered embossing, comprising:
   at least one engraved embossing cylinder, and a pressure counter-cylinder for the substantially continuous embossing of a laminate product;
   a hydraulic system arranged for imparting a thrust of the counter-cylinder towards the engraved embossing cylinder for obtaining an embossing pressure;
   a controller configured for the periodical registration of the engraved cylinder relative to the laminate product; and
   a hydraulic circuit configured for controlling the hydraulic system, suitable for cooperating with the controller, and suitable for temporarily separating the counter-cylinder from the engraved embossing cylinder, or suitable for temporarily reducing the embossing pressure, during the registration of the engraved embossing cylinder.

14. The apparatus according to claim 13 wherein the hydraulic system comprises at least one hydraulic cylinder and a piston, the piston acting on the counter-cylinder either directly or through an interface member, the hydraulic cylinder being dual effect and comprising a first chamber under pressure and a second chamber under pressure, the first and second chambers under pressure acting on opposite faces of the piston, so that the thrust pressure generated by the hydraulic system results from the difference between the pressure in the first chamber and the pressure in the second chamber.

15. The apparatus according to claim 13, further comprising:
   wherein the hydraulic circuit comprises a pump configured for feeding a fluid under pressure into the first chamber and the second chamber;
   lines for feeding the fluid under pressure to the first and second chambers, through a solenoid valve; and
   respective sensors of the pressure within the two chambers of the dual effect cylinder; a control PLC.

16. The apparatus according to claim 13 wherein the hydraulic circuit comprises a position sensor of the piston.

17. The apparatus according to claim 13, further comprising an interface member between the piston and the counter-cylinder.

18. The apparatus according to claim 17 wherein the interface member is eccentric controlled by an electrical motor.

* * * * *